Aug. 23, 1927. 1,639,895
V. RAGONA
MACHINE FOR MAKING DIVERGENT FASTENERS
Filed June 4, 1921 4 Sheets-Sheet 1

INVENTOR
Vincent Ragona
By H.J. Burkhard
ATTORNEY

Patented Aug. 23, 1927.

1,639,895

UNITED STATES PATENT OFFICE.

VINCENT RAGONA, OF BROOKLYN, NEW YORK, ASSIGNOR, BY MESNE ASSIGNMENTS, TO CARY MANUFACTURING CO., OF BROOKLYN, NEW YORK, A CORPORATION OF NEW YORK.

MACHINE FOR MAKING DIVERGENT FASTENERS.

Application filed June 4, 1921. Serial No. 475,148.

This invention is a machine for producing divergent corrugated fasteners of the type disclosed in United States Patent No. 1,328,911 granted to Spencer C. Cary on January 27, 1920.

The fastener to be produced by this machine embodies a straight web positioned intermediate two groups of corrugations, the latter being inclined reversely to each other, said corrugations being formed on one edge of the metal stock with saw teeth and the corresponding edge of the straight web being sharpened to produce a cutting edge in the plane of the points of the saw teeth.

Fasteners of this character are produced in strip form by the operation of a machine embodying my invention, said strip of fasteners being cut transversely at appropriate lines to produce the individual fasteners of the desired form.

In carrying out the invention I employ co-operating die rolls the working faces of which are formed with complemental dies operating to impart the divergent corrugations to metal stock of appropriate gage (thickness) and width. The rolls are driven continuously for producing the desired formation upon the stock, subsequent to which the stock is fed with an intermittent motion to appropriate dies acting to swage the edge of the metal and to produce the saw tooth formation upon the corrugated portions thereof. With the die rolls acting continuously, and with the swaging die and the tooth forming dies operating intermittently upon the edge portion of the stock, it becomes necessary to employ an intermittent feed means acting upon the stock to advance said stock during the periods of non-action of said dies. To this end, I provide a co-operating roll and pressure plate between which the formed stock is directed to pass, said feed roll being at rest during the period the swaging die and the tooth forming dies act upon the stock, but on the upstroke of the crosshead which carries said dies, the feed roll is rotated a certain regular distance for advancing the stock a distance equal to the length of one fastener, the action of the feed roll being obtained by the movement of a feed dog carried by a slide and co-operating with a ratchet on the feed roll shaft, said slide being actuated by the upstroke of the crosshead for giving the required travel to the feed dog and the feed roll.

Other functions and advantages of the invention will appear from the following description taken in connection with the drawings, wherein—

Figure 3:
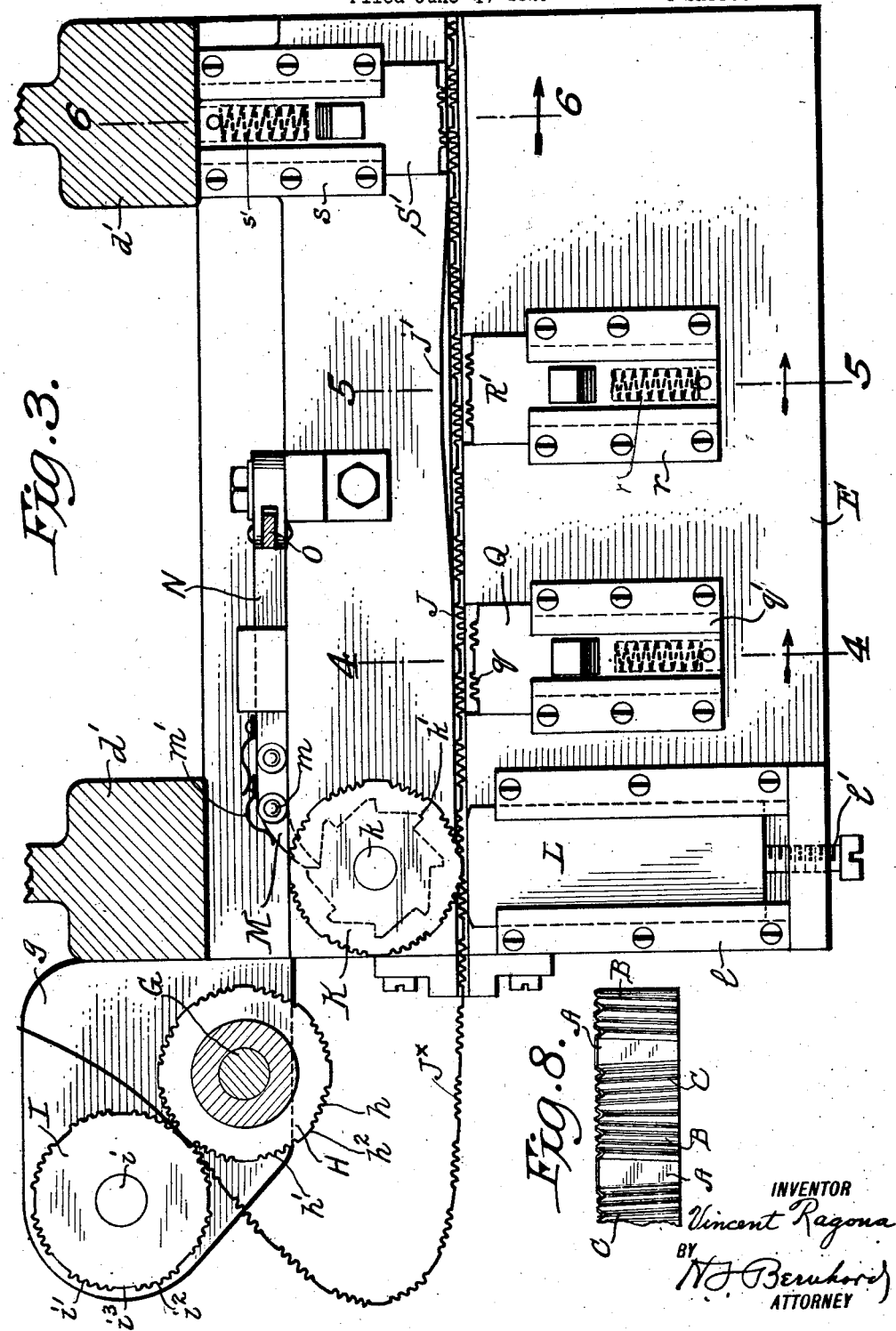
Figure 3 is a plan view partly in horizontal section taken on a plane above the table and the die rolls.
Figure 4:
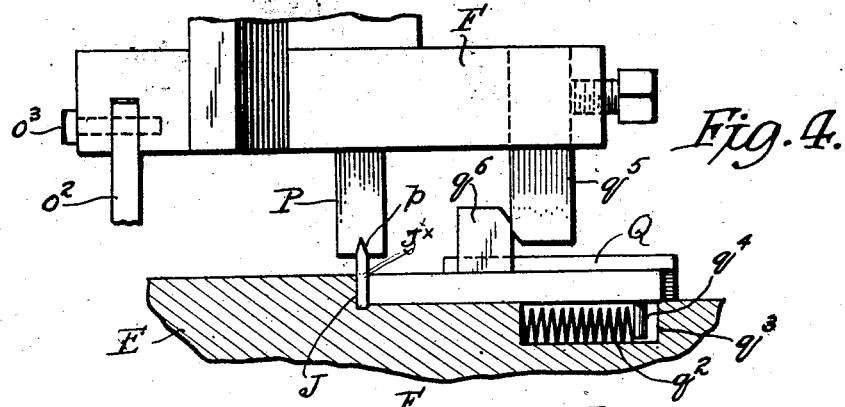
Figure 5:
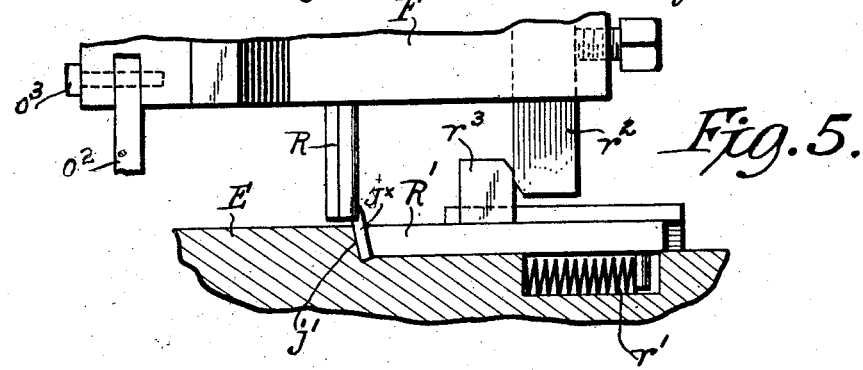
Figure 6:
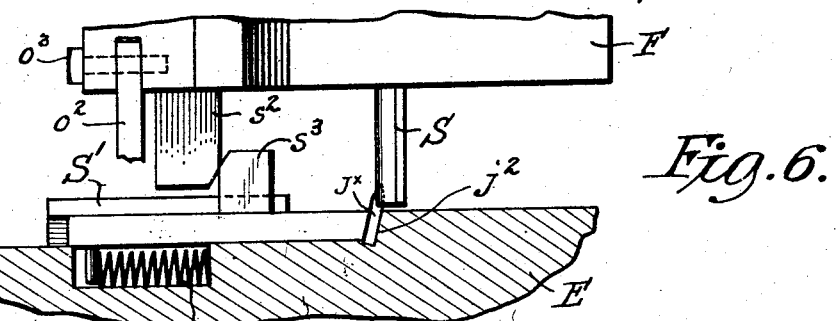

Figures 4, 5 and 6 are vertical transverse sections taken in the planes indicated by the dotted lines 4—4, 5—5 and 6—6, respectively, of Figure 3.

Figure 7:
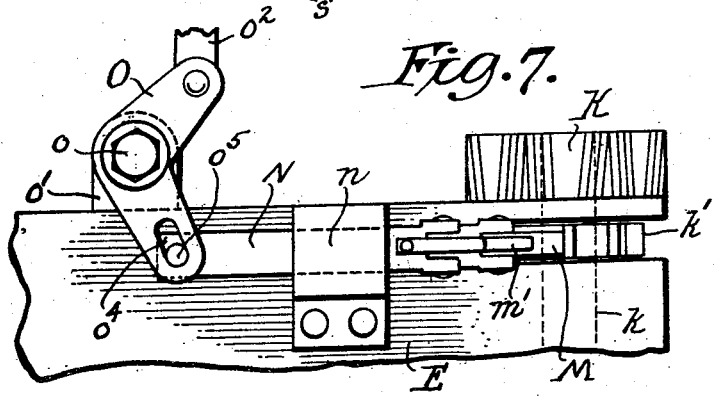

Figure 7 is an elevation looking toward the rear of the table illustrating the means for imparting a step feed to the feed roll.

Figure 8 is a plan view of a portion of the divergent corrugated fasteners in strip form.

Before proceeding to describe the construction and operation of the machine reference will be made to the article, the same being shown in strip form in Figure 8 of the drawings, and presenting a flat straight web A and divergent corrugations B C.

In the operation of the machine a metal strip of appropriate width and thickness is fed continuously to cooperating die rolls and is advanced by a feed mechanism intermittently to dies which act to swage one edge portion of the metal stock and to cut out on definite lines certain portions of the corrugations B C for the purpose of producing a saw tooth formation upon the corrugated portions of the metal stock, the points of the saw tooth being in the same plane as the sharpened edge on the flat web A, all as will more fully appear by reference to the prior Cary patent to which reference has been made.

A suitable framework D carries a table $d$ upon which is secured a bed E, said framework including suitable columns $d'$ having bearings $d^2$ for a crank shaft D'. The crosshead F is slidably fitted in guideways of the columns $d'$, and this crosshead is connected by a link $f$ with the crank of shaft $D'$ for the purpose of imparting reciprocating motion to the crosshead.

Figure 1:
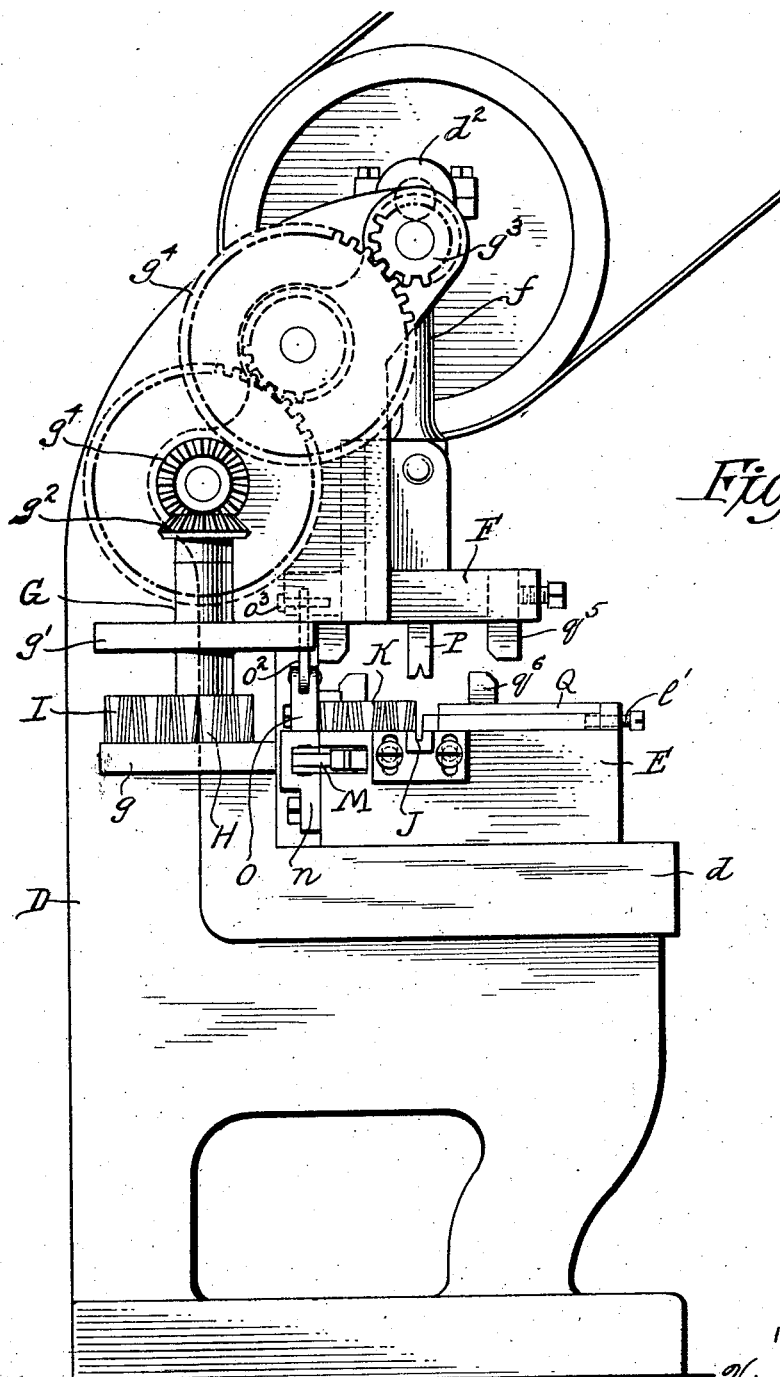
Figure 1 is an elevation looking at one end of the machine for making divergent corrugated fasteners constructed in accordance with this invention.
Figure 2:
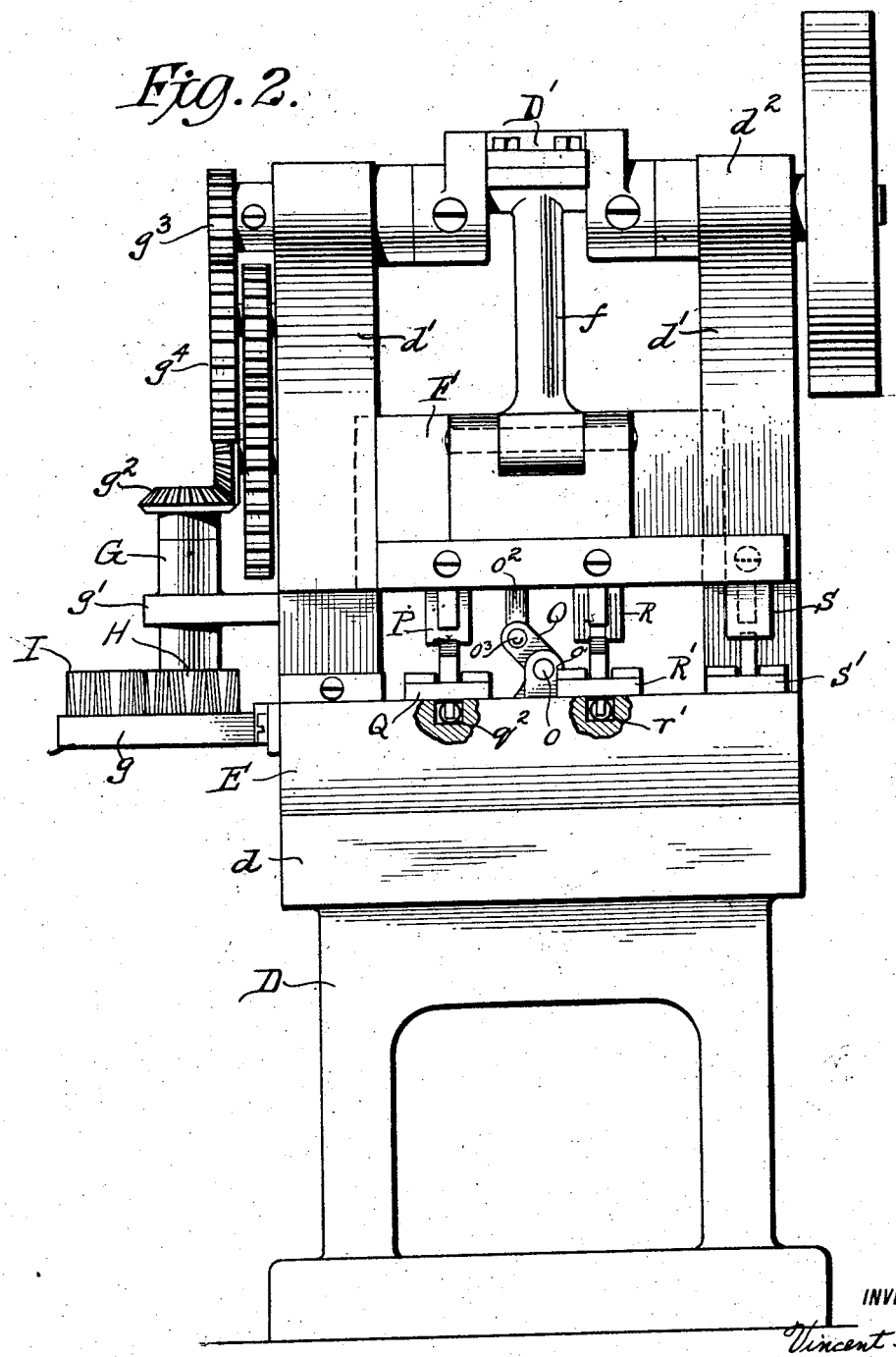
Figure 2 is a side elevation of the machine looking toward the right in Figure 1.

The framework carries at one side thereof a bracket $g$ in a bearing arm $g'$ which is provided with vertically aligned bearings for supporting a vertical shaft G of a power driven die roll H, the upper portion of said shaft G being provided with a bevel gear $g^2$ which is driven from a spur gear $g^3$ on crank shaft $D'$ by a gear train, the gears of which are indicated at $g^4$, see Figures 1 and 2, whereby the die roll H is driven continuously and at the required speed.

Co-operating with the driven die roll H is a companion die roll I, the shaft $i$ of which is mounted in suitable bearings of the bracket $g$, said die roll I turning idly with its companion die roll H. The power driven die roll H is provided with corrugations $h$ $h'$ separated by an intermittent plain surface $h^2$, the corrugations $h$ $h'$ in the surfaces of the die roll corresponding to the corrugations B C of the fastener to be produced, whereas the plain surface $h^2$ is intermediate the corrugations and said plain surface is offset with respect to the corrugated surfaces $h$ $h'$. The die roll I, however, is provided with corrugations $i'$ $i^2$, and with depressed plain surfaces $i^3$. The offset surfaces $h^2$ of die roll H conform to the depressed plain surfaces $i^3$ of die roll I; but on the periphery of die roll H the corrugations $h'$ $h^2$ are grooves sunken in said surfaces of roll H, whereas the corrugations $i'$ $i^2$ of die roll I protrude and match or register with said sunken corrugations $h$ $h'$ of roll H. The plain surfaces $h^2$ $i^3$ of rolls H I, respectively, have inclined edges corresponding to the taper of web A, whereas the corrugations $h$ $i'$ and $h'$ $i^2$ of said rolls H I are inclined in the required converging relation so as to properly produce the corrugations B C in the metal stock and thereby give the required divergent form to the resulting corrugated fastener.

The metal stock is fed by any suitable directing means to the pass between the co-operating die rolls H I, the roll H being driven continuously through the train of gears $g^2$ $g^3$ $g^4$. The roll H is a male die whereas the roll I is a female die, the die surfaces of the two rolls matching or registering for the purpose of having said two rolls coact in imparting the required rotation to roll I by the positively driven roll, whereby the male die roll and the female die roll operate in unison so as to give to the metal stock the required formation so as to result in the production on said metal stock of the diverging corrugations and the straight web intermediate said corrugations.

For presenting the stock to the dies which swage one edge portion thereof and for producing a saw tooth formation thereon, the bed plate E is provided with a longitudinal channel J formed by a groove in the upper face of said bed plate. After passing the die rolls the metal stock is directed into channel J, and is first engaged by feed devices acting on each stroke of the crosshead to advance the stock with a step feed, there being a loop of the stock between the intermittently actuated feed devices and the continuously rotating die rolls, see Figure 3. The feed devices are embodied in the form of a roll K and a plate L co-operating with said roll. The feed roll is carried by a short vertical shaft $k$ mounted in a suitable bearing of the bed plate, and on this roll shaft is a ratchet $k'$, indicated by dotted lines in Figure 3 and shown in full lines in Figure 7. The surfaces of the feed roll are provided with corrugations and with the plain faces similar to the surfaces $h$ $h'$ $h^2$ of die roll H.

The plate L which co-operates with the feed roll is positioned and held within the guideway $l$ provided on the top surface of the bed plate E. The edge of the feed plate next to the roll is smooth for the metal stock to slide along said edge under the action of the roll; but the feed plate may be moved by an adjusting screw $l'$ so that the edge of the plate next to the roll may be shifted as required to allow the desired freedom of movement of the stock in contact with said edge of the feed plate. The feed roll and its ratchet are actuated by a dog M which is pivoted at $m$ to an end portion of slide N. Said slide is confined within a guide $n$ fixedly secured to the rear of the bed plate E, the dog M being pressed by a spring $m'$ into the required engagement with the teeth of the ratchet $k'$. The slide is reciprocated by an operative connection with crosshead F afforded by a bell-crank O fulcrumed at $o$ to a fixed upstanding lug $o'$. One arm of the bell-crank is connected by a link $o^2$ pivoted at $o^3$ to the rear of crosshead F, whereas the other arm of the bell-crank is provided with a slot $o^4$ in which is fitted a stud $o^5$ on the feed slide N, whereby reciprocating motion of the crosshead F is communicated through the bell-crank to the slide N which in turn imparts the movement to the feed dog M for intermittently turning the feed roll K.

The corrugations B C of the stock are swaged on one edge of said stock for the purpose of beveling said corrugated portions of the metal stock preliminary to the formation of the saw teeth, said swaging operation being performed by swaging die P carried by the crosshead F, see Figure 4. During the swaging operation the metal stock $J^x$ is seated on the bottom of the feed channel J so as to occupy a vertical position directly below the swaging die, the lower face of which is provided with a recess $p$, the walls of which diverge downwardly and which walls compress the corrugations on one edge of the metal stock for the purpose of bevelling the same without cutting out any metal from the stock.

For retaining the stock in the required vertical position during the swaging operation, I employ a clamping element in the form of a plate Q, the working face $q$ of which plate conforms to the contour of the metal stock, see Figure 3. Said clamping plate is confined within a guideway $q'$ provided on the upper face of the bed plate E, but normally said clamping plate is pressed away from the feed channel J by a spring $q^2$ which is housed within a recess $q^3$ provided in the bed plate E. The spring $q^2$ acts on a stud $q^4$ which depends from the clamping plate, as shown in Figure 4. As the crosshead F descends the plate Q is pressed toward and into contact with the metal stock positioned in the guideway J by the contact of an arm $q^5$ with a cam $q^6$, said arm $q^5$ depending from the crosshead F, whereas the cam $q^6$ stands upwardly from the clamping plate Q.

The corrugated stock having been swaged for the purpose of producing bevels on the edge of said stock at the corrugated portions thereof, the next operation by the machine upon the stock consists in cutting out the swaged corrugated portions on definite lines to produce the saw teeth formation on said corrugated portions B C of the stock, leaving the straight webs A unaffected by the cutting out operation. The first cutting die R, shown in Figure 5, acts upon the swaged corrugated portions of the stock for the purpose of removing some of the swaged material on definite lines, whereas the final cutting die S, shown in Figure 6, acts upon other portions of the swaged stock at the corrugated portions thereof for the purpose of completing the saw tooth formation. The cutting dies R S are carried by the crosshead F in the required spaced relation, as shown in Figure 2, and illustrated more particularly in Figures 5 and 6. When the die R descends with the crosshead, the metal stock is inclined in one direction, as shown in Figure 5, for which purpose one wall of the channel J is inclined as at $j'$, but when the stock is moved along so that it is below the other cutting out die S, said stock is inclined in the opposite direction, as shown in Figure 6, for which purpose the other wall of the feed channel J is inclined as at $j^2$ in Figures 3 and 6.

For clamping the stock against the inclined section $j'$ of the feed channel, as in Figure 5, I employ clamping plate R', the face of which conforms to the metal stock. This clamping plate is fitted in a guideway $r$ of the bed plate and it is acted on by spring $r'$ tending to normally press the plate away from the guide-channel. The plate is positively moved against the tension of the spring by an arm $r^2$ acting on an upstanding cam $r^3$ of the clamping plate, said arm $r^2$ co-acting with the cam in forcing the plate R' against the metal stock so as to deflect said stock into an inclined position and to clamp the same immovably in place and in the required relation to the path of the cutting die R.

Similar means for clamping the stock in the reversely inclined section $j^2$ of the feed channel are provided for co-operation with the cutting die S. The clamp plate S' is slidably fitted in guideways and is acted on by a spring $s'$, positive motion being given to the clamping plate toward and into contact with the stock by the arm $s^2$ of the crosshead F contacting with the cam $s^3$ standing upwardly from the clamping plate S', see Figure 6.

The operation may be described as follows: The metal stock is fed to the die rolls which act to impart the corrugations thereto as shown in Figure 8, said stock passing thence to the feed channel J so as to have the desired relation to feed roll K and the clamping plates Q R' S'. On the descent of the crosshead the dies P R S act upon the metal stock for the purpose of compressing one part of the stock by the swaging die P, for cutting out a part of the corrugated stock thereof by the die R, and for cutting out the remainder of the stock by the die S acting on the opposite face of said stock to complete the saw tooth formation. On the ascent of the crosshead F, the dies P R S are lifted from the stock, and thereupon the slide N is moved in one direction by the bell-crank O so that the feed dog M turns the feed roll a distance of one tooth of ratchet $k'$, the effect of which is to feed the stock within the channel J for a distance equal to one complete corrugated divergent fastener. The stock emerges from the feed channel in strip form substantially as shown in Figure 8, and thereafter the stock is cut on a line between the oppositely inclined corrugations B C, thus producing individual fasteners of the required formation.

Having thus fully described the invention, what I claim as new and desire to secure by Letters Patent is:

1. In a machine for making divergent fasteners of the class described, a plurality of die-rolls provided with matching surfaces in intaglio and in relief for producing on metal stock divergent corrugations and webs intermediate said corrugations, in combination with dies acting subsequently to the die rolls and upon one edge only of the metal stock for producing saw teeth on the corrugated portions of said stock, feed-rolls positioned intermediate said die-rolls and said tooth-forming dies, and means for intermittently actuating said feed-rolls.

2. In a fastener making machine, co-operating die-rolls, means for rotating the same, a reciprocating cross-head, a plurality of dies carried by said crosshead, feed means for the metal stock, and means operated by the movement of said crosshead for intermittently actuating the stock feeding means.

3. In a machine for making divergent fasteners of the class described, a plurality of complemental die-rolls provided with matching-surfaces in relief and in intaglio for the formation of divergent corrugations in alternate relation to flat surfaces, combined with a channel within which the formed stock is directed in a determined path, tooth-forming dies acting upon edge only of the corrugated portions of the metal stock, feed-rolls positioned intermediate said die-rolls and said tooth forming dies, and means for intermittently actuating said feed-rolls and said tooth-forming dies.

4. In a machine for making divergent fasteners of the class described, a plurality of complemental die rolls provided respectively with matching surfaces in relief and in intaglio for deforming metal stock to produce straight webs intermediate adjacent divergent corrugations, in combination with means for producing a saw tooth formation upon an edge portion of the corrugated portions only of said metal stock.

5. In a machine for making divergent fasteners of the class described, a plurality of complemental die rolls provided respectively with matching surfaces in relief and in intaglio for deforming metal stock to produce straight webs intermediate adjacent divergent corrugations, in combination with means for directing the metal stock in a definite path subsequent to the action of the die rolls thereon, dies positioned to produce a saw tooth formation upon the corrugated portions only of the metal stock, and means for imparting intermittent motion to the metal stock.

6. In a fastener making machine, the combination of co-operating die-rolls, means for rotating the same, a feed channel within which the stock passes subsequently to the action of the die-rolls thereon, a plurality of dies in operative relation to the feed channel, a feed roll positioned for contact with the metal stock intermediate the die-rolls and the dies, and means operated by the reciprocatory movement of the said dies for intermittently imparting rotative movement to said feed roll.

7. In a fastener making machine, the combination of co-operating die-rolls, means for rotating the same, a feed channel within which the stock passes subsequently to the action of the die-rolls thereon, a reciprocating swaging die, a plurality of cutting dies, a feed roll positioned intermediate the die-rolls and the swaging die, pawl and ratchet mechanism for imparting rotative movement intermittently to said feed roll, and means operated by the reciprocating movement of the dies for imparting movement to said pawl and ratchet mechanism.

In testimony whereof I have signed my name hereto this 19th day of May, 1921.

VINCENT RAGONA.